(12) United States Patent
Umesh et al.

(10) Patent No.: US 7,027,839 B2
(45) Date of Patent: Apr. 11, 2006

(54) COMMUNICATION METHOD USING DIRECTIONAL BEAM AND RADIO BASE STATION

(75) Inventors: Anil Umesh, Yokohama (JP); Shinya Tanaka, Yokohama (JP); Takehiro Nakamura, Yokosuka (JP); Koichi Okawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 219 days.

(21) Appl. No.: 10/693,909

(22) Filed: Oct. 28, 2003

(65) Prior Publication Data

US 2004/0137952 A1    Jul. 15, 2004

(30) Foreign Application Priority Data

Oct. 29, 2002    (JP)    ............... P2002-314975

(51) Int. Cl.
*H04M 1/00*    (2006.01)

(52) U.S. Cl. .................. 455/562.1; 455/561; 455/273; 370/334; 370/249; 343/757; 342/372; 342/373

(58) Field of Classification Search ............. 455/562.1, 455/561, 273; 370/334, 249; 343/757; 342/372, 342/373
See application file for complete search history.

(56) References Cited

U.S. PATENT DOCUMENTS

| 6,141,335 | A | 10/2000 | Kuwahara et al. | |
| 6,473,036 | B1 * | 10/2002 | Proctor, Jr. | ................. 342/372 |
| 6,665,545 | B1 * | 12/2003 | Raleigh et al. | ........... 455/562.1 |
| 2003/0148770 | A1 * | 8/2003 | Das et al. | ................... 455/455 |
| 2004/0014501 | A1 * | 1/2004 | Kuwahara et al. | ........... 455/561 |
| 2004/0127260 | A1 * | 7/2004 | Boros et al. | .............. 455/562.1 |
| 2004/0233871 | A1 * | 11/2004 | Seki et al. | ................... 370/331 |

FOREIGN PATENT DOCUMENTS

| EP | 0 837 523 | 4/1998 |
| JP | 2000-332668 | 11/2000 |

OTHER PUBLICATIONS

H. Taoka, et al., IEEE Wireless Communications, pp. 2-10, "Adaptive Antenna Array Transmit Diversity in FDD Forward Link for WCDMA and Broadband Packet Wireless Access", Apr. 2002.

(Continued)

*Primary Examiner*—Danh Cong Le
(74) *Attorney, Agent, or Firm*—Oblon, Spivak, McClelland, Maier & Neustadt, P.C.

(57) ABSTRACT

The object of the present invention is to avoid disconnection of a radio link between the radio base station and the mobile station even when the mobile station moves while transmitting no up signals in a case where the radio base station transmits the directional beam. The radio base station according to the present invention comprises an array antenna 11 to transmit/receive the directional beam, an transceiver 12 to receive an up signal from a mobile station 2 and to generate a directional beam pattern for each mobile station according to an antenna weight, a up signal interval measurer 13 to measure elapsed time from reception of the up signal, and a antenna weight generator 15 to change the antenna weight based on a result of measuring by the up signal interval measurer 13.

6 Claims, 11 Drawing Sheets

OTHER PUBLICATIONS

S. Tanaka, et al., Vehicular Technology Conference, vol. 4 of 4, Conf. 53, XP-001076169, pp. 2302-2306, "Optimum Transmit Antenna Weight Generation Method for Adaptive Antenna Array Transmit Diversity in W-CDMA Forward Link", May 6, 2001.

M. Mizuno, et al., Electronics and Communications in Japan, Part I: Communications, vol. 77, No. 2, XP-000468597, pp. 48-58, "Application of Adaptive Array Antennas to Radio Communications", Feb. 1, 1994.

* cited by examiner

COMMUNICATION METHOD USING DIRECTIONAL BEAM AND RADIO BASE STATION

CROSS REFERENCE TO RELATED APPLICATIONS

This application is based upon and claims the benefit of priority from the prior Japanese Patent Applications No. P2002-314975, filed on Oct. 29, 2002; the entire contents of which are incorporated herein by reference.

BACKGROUND OF THE INVENTION

1. Field of the Invention

The present invention relates to a communication method using directional beam and a radio base station conducting radio communication according to a sector-cell configuration of Code Division Multiple Access (CDMA) scheme adopting spectral spreading. More specifically, the present invention relates to a communication method and a radio base station performing transmission/reception of the directional beam using a plurality of antennas.

2. Description of the Related Art

Conventionally, as a mobile communication system, a cellular system covering a service area by deploying a plurality of radio base stations according to cells is used. Further, a sector-cell configuration, which divides a cell into multiple sectors, is used. A service area is then configured by deploying a base station antenna in respective sectors. For the mobile communication system, normally a three (3) or six (6) sector-cell configuration is adopted as shown in FIGS. 1A and 1B.

Moreover, it is known that transmission/reception of a directional beam using an adaptive antenna array reduces interference from other users (mobile station). The transmission/reception of the directional beam is performed using a plurality of antennas to synthesize signals received at the antennas with an appropriate weight so that interference from the other users can be reduced. In DS-CDMA (Direct Sequence-CDMA) scheme, reception method according to Coherent Adaptive Antenna Array Diversity (CAAAD) using a pilot symbol has been proposed.

For a downlink, a transmission method transmitting the directional beam has also been proposed. In the transmission method, a directional beam is transmitted after compensation for signal amplitude and phase variations occurring on a radio link is performed to a directional beam pattern formed on an uplink. The interference from the other users located in the same sector and other sectors can be reduced by transmitting the directional beam to the downlink.

A dedicated channel for transmission of information data of respective users and a common channel for transmission of control data that is common to all the users are available for the downlink. FIGS. 2A and 2B shows typical examples of the directional beam pattern for the dedicated channel and the common channel at the radio base station performing transmission/reception of the directional beam using the adaptive antenna array.

As shown in FIG. 2A, the interference between users can be reduced by transmitting the directional beam for the dedicated channel of each user using a beam pattern BP21 and BP22, in which coverage is narrowed. On the other hand, as shown in FIG. 2B, a non-directional beam pattern BP23 is used for the common channel in order for all the users located in the sector to receive the control data.

However, in the transmission method using the directional beam described above, the adaptive antenna array has to optimize an antenna weight (weight to be applied to a signal inputted to each antenna) in order to reduce interference by forming a directional beam towards each user appropriately.

Further, in the above method, the antenna weight has to be updated frequently according to a movement of mobile stations MS (both an interfered MS and an interfering MS) and variations in propagation conditions (e.g., a movement of a reflecting object) to maintain transmission of the directional beam towards the mobile station MS. Moreover, the antenna weight is updated at the radio base station using LMS (Least Mean Square) or RLS (Recursive Mean Square) algorithms based on the pilot symbol received from each MS in the conventional method.

In a case where the mobile station MS always transmits an up signal towards the radio base station, e.g., AMR (voice) used under a circuit exchange method, the radio base station can extract required information to update the antenna weight from the pilot symbol. Accordingly, the radio base station can form an appropriate directional beam towards the mobile station MS and track the mobile station MS without difficulty.

However, in a case where the mobile station MS transmits the up signal intermittently (e.g., transmission of packet data or a signal arrived at the radio base station is weak), the radio base station receives the up signal intermittently. This causes occurrence of a period where the radio base station receives no pilot symbols from the mobile station MS. Therefore, the radio base station cannot update the antenna weight and direction of the beam that is determined by the antenna weight during the period.

Specifically, as shown in FIG. 3, if a mobile station 2 moves outside the coverage of the directional beam BP23 (a position shown as notation 2' in FIG. 3) during a period where a radio base station 1 receives no pilot symbols, a radio link between the mobile station 2 and the radio base station 1 is disconnected. Especially, it is assumed that the mobile station 2 mainly performs data reception during packet data communication, and this causes an interval of the up signal transmitted by the mobile station 2 to be lengthened. Therefore, it is highly possible that the radio link would be disconnected under such situation.

BRIEF SUMMARY OF THE INVENTION

An object of the present invention is to provide a communication method using directional beam and a radio base station capable of avoiding disconnection of a radio link between the radio base station and a mobile station even when the mobile station moves transmitting no up signals in a case where the radio base station transmits the directional beam.

To attain the object, in the present invention, when conducting communication between a radio base station and a mobile station by a directional beam generated by an adaptive array antenna having a plurality of antenna elements, receiving an up signal from the mobile station, measuring an elapsed time from reception of the up signal, changing an antenna weight, which is the weighting factor for a signal for each mobile station to be inputted to the adaptive array antenna, based on a result of the measuring step and generating a directional beam pattern for each mobile station according to the antenna weight, are performed.

Incidentally, in the above invention, it is preferred that the antenna weight is changed so as to expand a coverage of the directional beam if the result of the measuring exceeds a prescribed threshold. It is also preferred that if required, the antenna weight is changed so as to cover an entire sector in which the mobile station is located if the result of the measuring exceeds the prescribed threshold.

According to the present invention, a period where no signals are transmitted by the mobile station is measured and the antenna weight is changed when the period exceeds the threshold. Therefore, a width of the directional beam formed for the mobile station can be expanded and disconnection of the radio link can be avoided even when the mobile station moves within the sector while transmitting no up signals.

In the above invention, it is preferred that a plurality of the prescribed thresholds are used, and the antenna weight is changed so as to expand a coverage of the directional beam in a step-by-step basis if the result of the measuring step exceeds each of prescribed thresholds. In this case, the period where no signals are transmitted by the mobile station is measured and the width of the directional beam pattern can be adjusted according to the length of the period. This allows that an expansion rate of the directional beam pattern can be set appropriately in view of a moving speed of the mobile station and a geographic position of the base station for example.

In the above invention, it is preferred that the antenna weight is changed so as to expand coverage of the directional beam if the result of the measuring exceeds a prescribed threshold, and the antenna weight is further changed according to a prescribed algorithm if the base station receives the up signal while the base station is expanding the coverage of the directional beam. In this case, the effect of interference reduction can still be optimized while maintaining avoidance of disconnection of the radio link. Thus, capacity available for conducting radio communication can be increased.

According to the invention, it is achieved that a communication method using directional beam, wherein in a changing step, the antenna weight is changed so as to expand a coverage of the directional beam if the result of a measuring step exceeds a prescribed threshold.

Further, as for the communication method using directional beam, in the changing step, a plurality of prescribed thresholds maybe used, and the antenna weight may be changed so as to expand a coverage of the directional beam in a step-by-step basis if the result of the measuring step exceeds each of the prescribed thresholds.

Moreover, as for the communication method using directional beam, in the changing step, the antenna weight may be changed so as to cover an entire sector in which the mobile station is located if the result of the measuring step exceeds the prescribed threshold.

Still more, as for the communication method using directional beam, in the changing step, the antenna weight may be changed so as to expand coverage of the directional beam if the result of the measuring step exceeds a prescribed threshold, and the antenna weight is further changed according to a prescribed algorithm if the radio base station receives an up signal while the radio base station is expanding the coverage of the directional beam.

DETAILED DESCRIPTION OF THE INVENTION (First Embodiment)

Figure 1A:
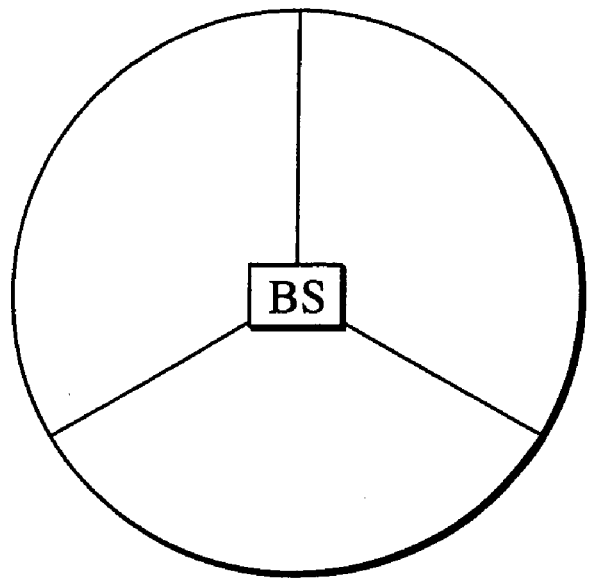
FIGS. 1A and 1B are explanatory diagrams showing sector-cell configurations according to the conventional art.
Figure 1B:
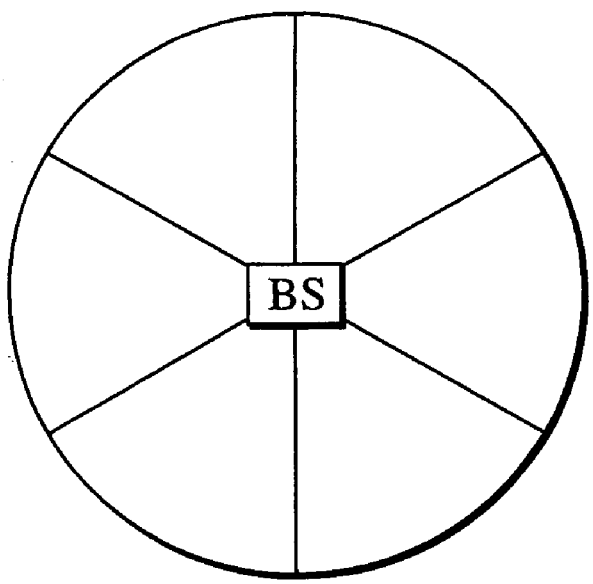
Figure 2A:
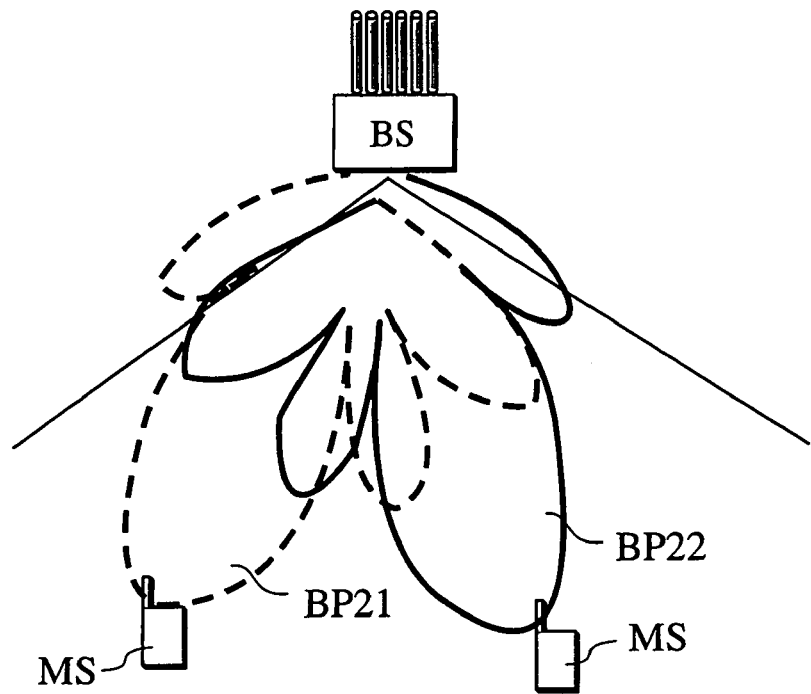
FIGS. 2A and 2B are explanatory diagrams showing transmission beam pattern for a downlink according to the conventional art.
Figure 2B:
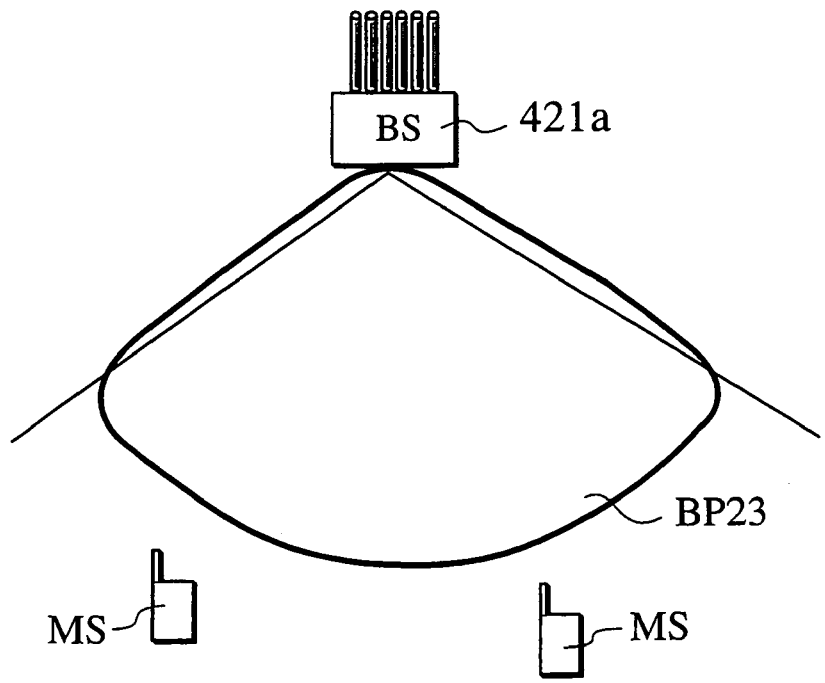
Figure 3:
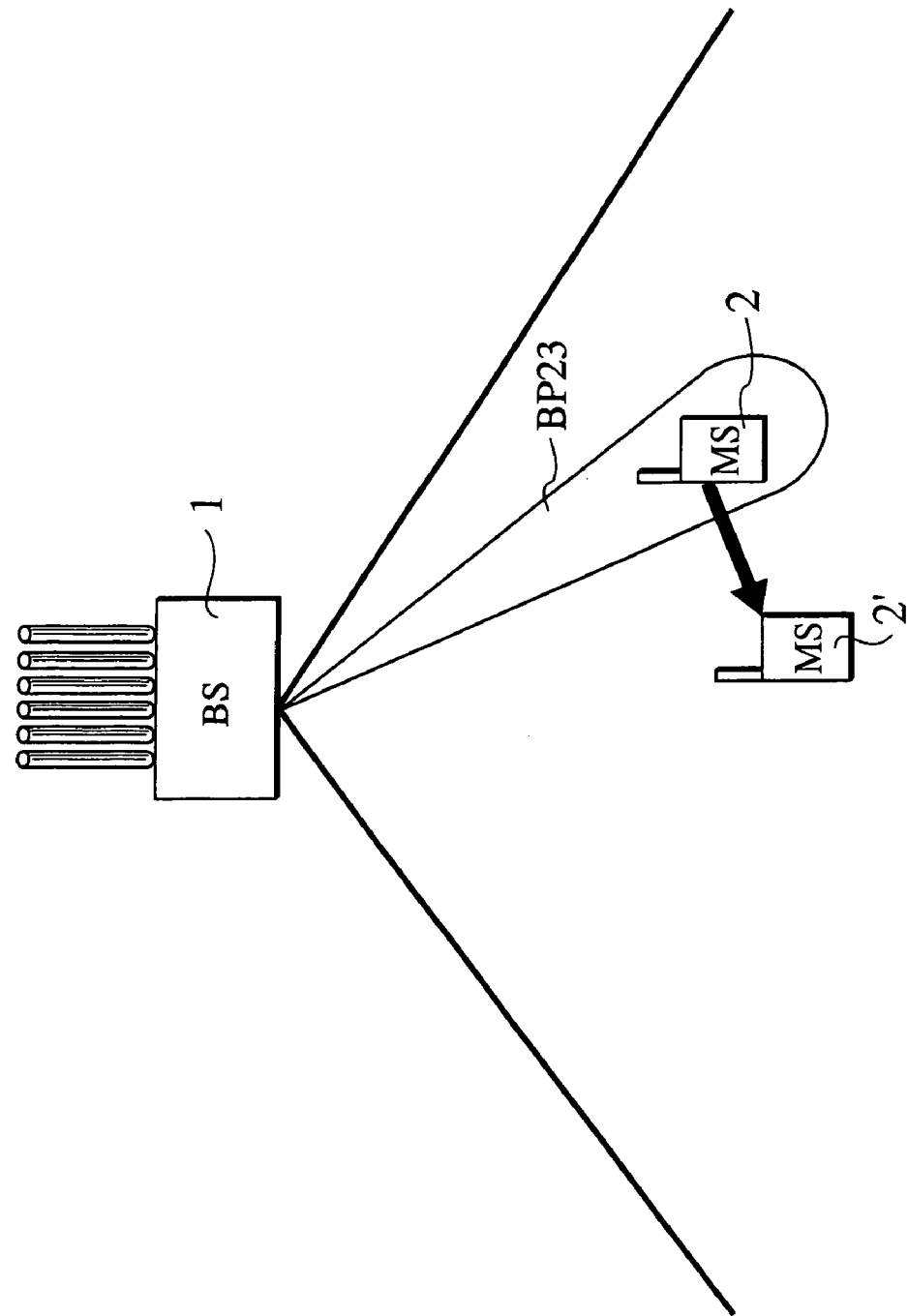
FIG. 3 is an explanatory diagram showing situation in which the radio link is disconnected when the mobile station moves outside the directional beam coverage according to the conventional art.
Figure 4:
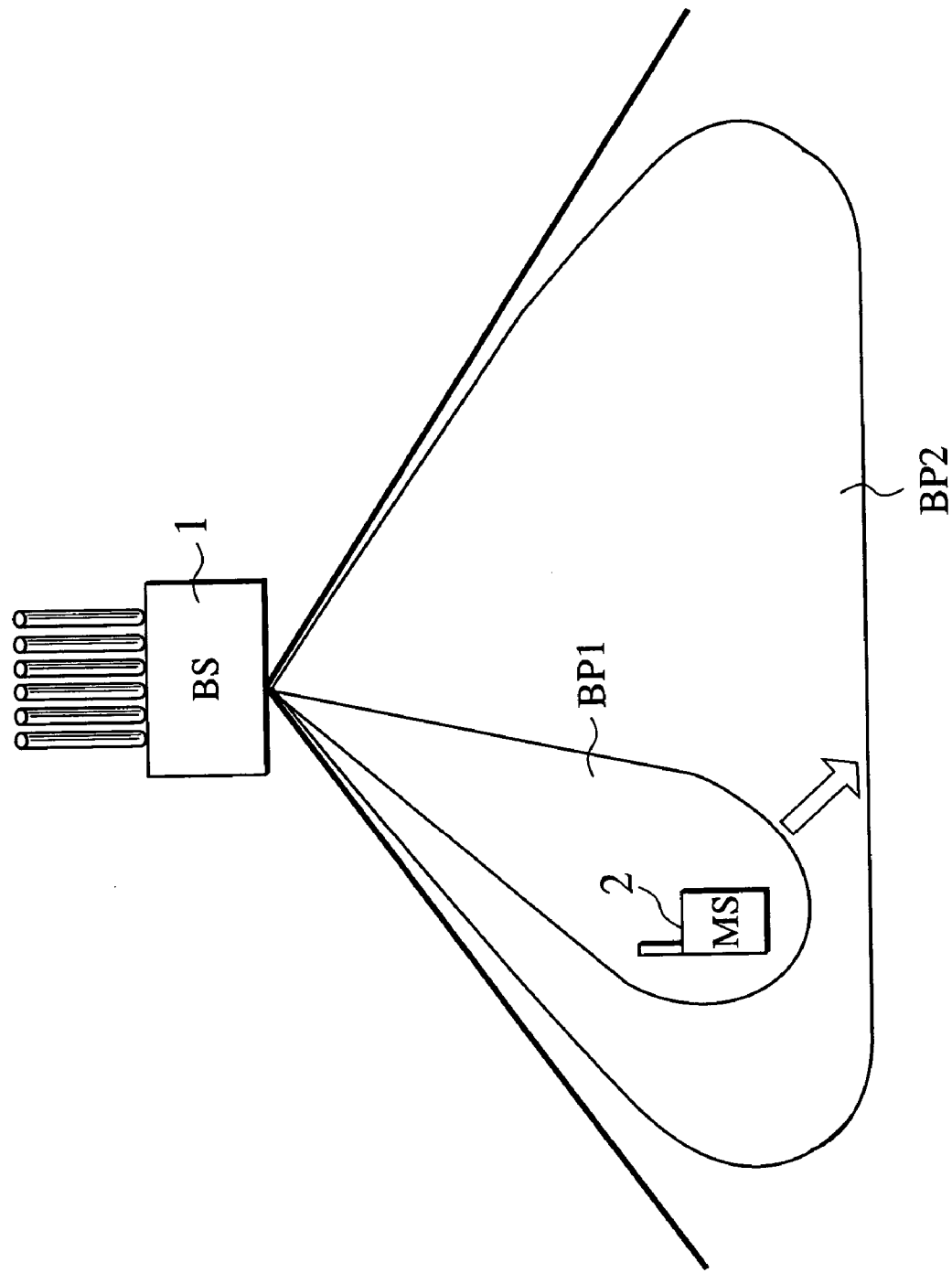
FIG. 4 is an explanatory diagram showing directional beam patterns when the mobile station transmits no up signals in a communication system according to a first embodiment.

A first embodiment of the present invention will now be described with reference to the drawings. FIG. 4 shows an explanatory diagram showing an example of a communication system using a directional beam.

As shown in FIG. 4, the communication system according to the embodiment is a system conducting radio communication between a mobile station 2 and a base station 1 with a sector-cell configuration. The base station 1 conducts a radio communication with the mobile station 2 using directional beams BP1 and BP2. Incidentally, in FIG. 4, a signal for an uplink, i.e., an up signal is received at the base station 1 and the directional beam BP1 is formed at the base station 1 according to an antenna weight determined by an antenna weight optimization algorithm. The radio communication is then conducted between the mobile station 2 and base station 1. Further, the directional beam is not changed basically at the base station 1 until a new up signal is received at the base station 1.

Figure 5:
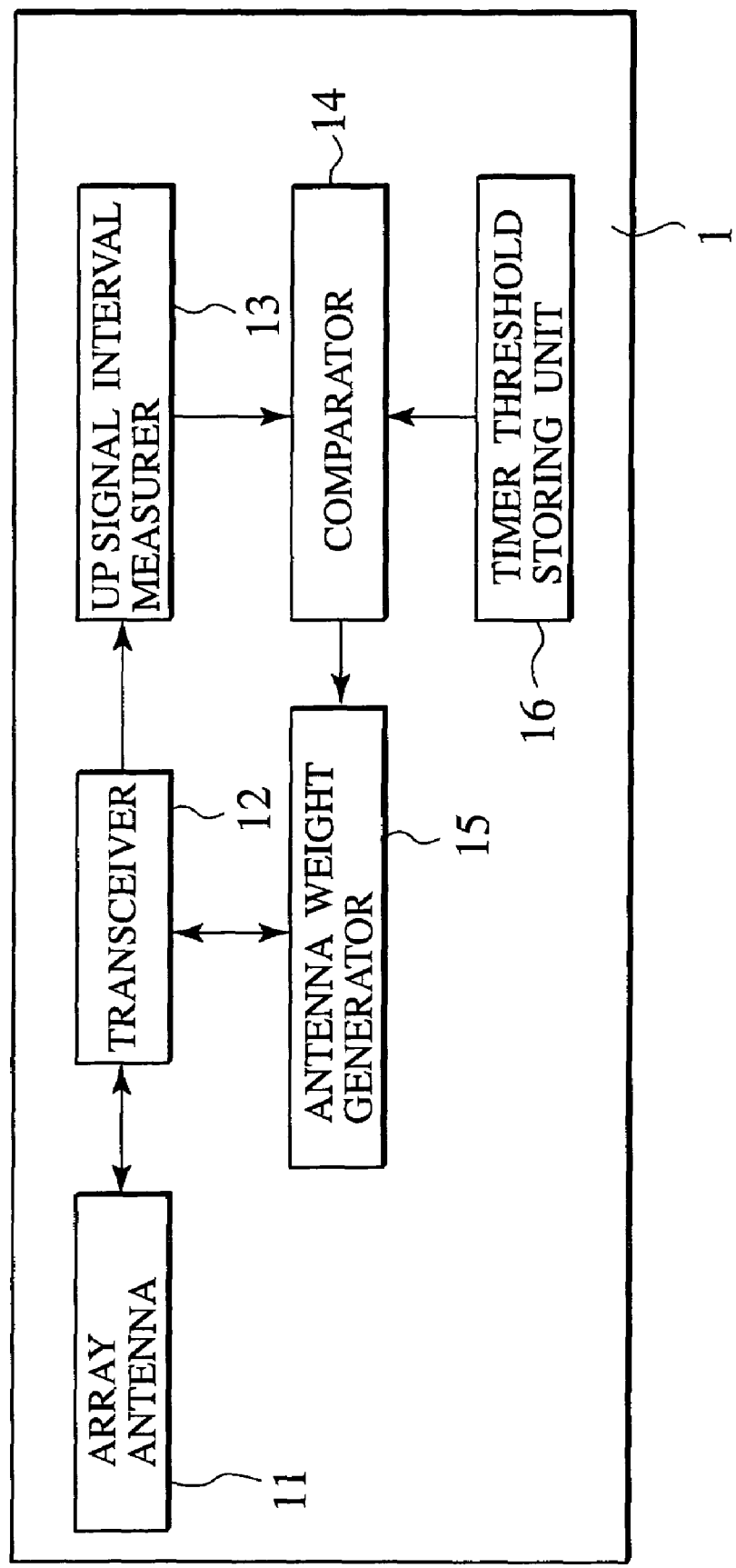
FIG. 5 is a block diagram showing a configuration of the mobile station according to the first embodiment.

FIG. 5 shows a block diagram of the base station 1. As shown in FIG. 5, the base station 1 includes an array antenna 11, a transceiver 12, an up signal interval measurer 13, a comparator 14, an antenna weight generator 15 and a timer threshold storing unit 16.

The array antenna 11 generates a directional beam pattern for each mobile station according to an antenna weight that is the weighting factor for each mobile station inputted to the array antenna 11 by the antenna weight generator 15. The radio communication between mobile station 2 and base station 1 is conducted by the directional beam. Incidentally, the array antenna 11 configures a beam pattern generator.

The transceiver 12 is a module to transmit and receive various signals. The transceiver 12 can transmit and receive intermittent signals, e.g., signals for packet data, in this embodiment, and the transceiver 12 receives the up signal from the mobile station 2 and transmits a down signal to the mobile station 2. Incidentally, the transceiver 12 configures a receiver.

The transceiver 12 acquires a reception power at each element of the array antenna 11 as signals when it receives the up signal. The transceiver 12 then synthesizes the signals using the antenna weight generated by the antenna weight generator 15. Further, the transceiver 12 distributes the down signal to each element of the array antenna 11 using the antenna weight generated by the antenna weight generator 15 at the transmission.

The up signal interval measurer 13 measures an elapsed time from the reception of the up signal transmitted by the mobile station 2 (up signal interval: $\tau$). Incidentally, the up signal interval measurer 13 configures a timer. The up signal interval measurer 13 resets a measured elapsed time when reception of the up signal is notified by the transceiver 12 in order to measure the elapsed time from the time of the last up signal received. The up signal interval measurer 13 outputs a value of measured elapsed time to the comparator 14.

The comparator 14 acquires an up signal interval, i.e., the value of the elapsed time measured by the up signal interval measurer 13 and a timer threshold stored in the timer threshold storing unit 16. The comparator 14 then compares the up signal interval and the timer threshold, and outputs a result of a comparison. The timer threshold storing unit 16 is a storing unit to store the timer thresholds for the up signal interval.

The antenna weight generator 15 generates the antenna weight according to the comparison performed by the comparator 14. Incidentally, the antenna weight generator 15 configures an antenna weight changer. Specifically, the antenna weight generator 15 changes the antenna weight so as to expand a width of the directional beam pattern if the up signal interval exceeds the timer threshold.

Figure 6:
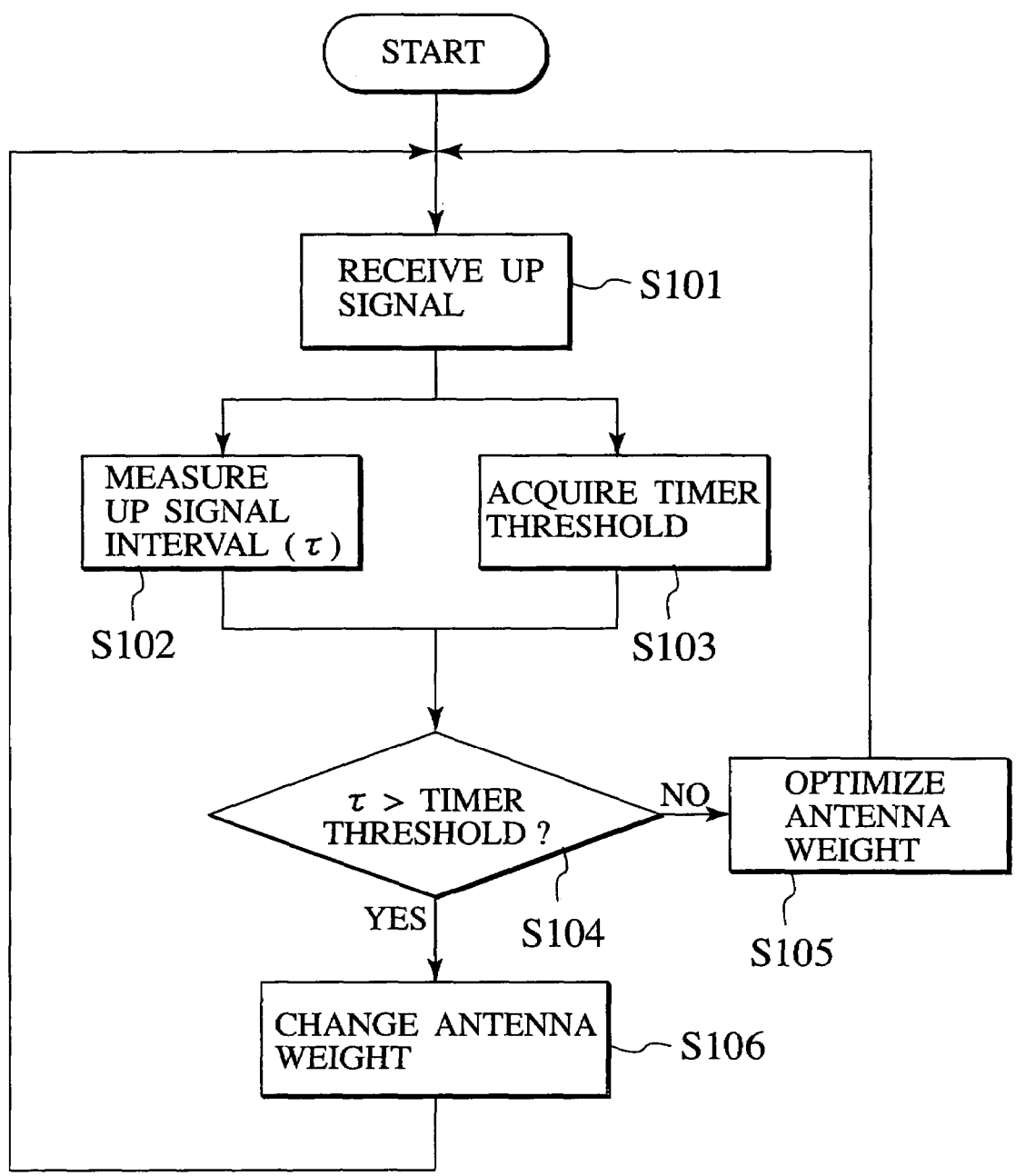
FIG. 6 is a flowchart showing operation of the communication system according to the first embodiment.

The communication system using the directional beam described above operates as follows. FIG. 6 shows a flowchart explaining an operation of the communication system.

First of all, the base station 1 receives the up signal from the mobile station 2 (S101). In this step, the transceiver 12 synthesizes the reception power at each element of the array antenna 11 according to the antenna weight generated by the antenna weight generator 15.

The up signal interval measurer 13 measures an elapsed time from reception of the last up signal and outputs the value of the elapsed time to the comparator 14 one after another (S102). The comparator 14 acquires the value of the elapsed time, i.e., an up signal interval ($\tau$), and a timer threshold stored in the timer threshold storing unit 16 (S103). The comparator 14 then compares the up signal interval and the timer threshold (S104), and outputs a result of comparison of the up signal interval and the timer threshold to the antenna weight generator 15.

At the step S104, if the comparator 14 determines that the up signal interval does not exceed the timer threshold ("N" of the step S104), the antenna weight generator 15 generates the antenna weight based on the pilot symbol included in the up signal transmitted by the mobile station 2 (S105).

Incidentally, the antenna weight generator 15 generates the antenna weight according to the antenna weight optimization algorithm, e.g., LMS and RLS.

On the other hand, if the comparator 14 determines that the up signal interval exceeds the timer threshold ("Y" of the step S104), the antenna weight generator 15 changes the antenna weight to a different weight which differs from the antenna weight generated according to the antenna weight optimization algorithm so as to expand the width (coverage) of the directional beam pattern (S106).

Figure 7A:
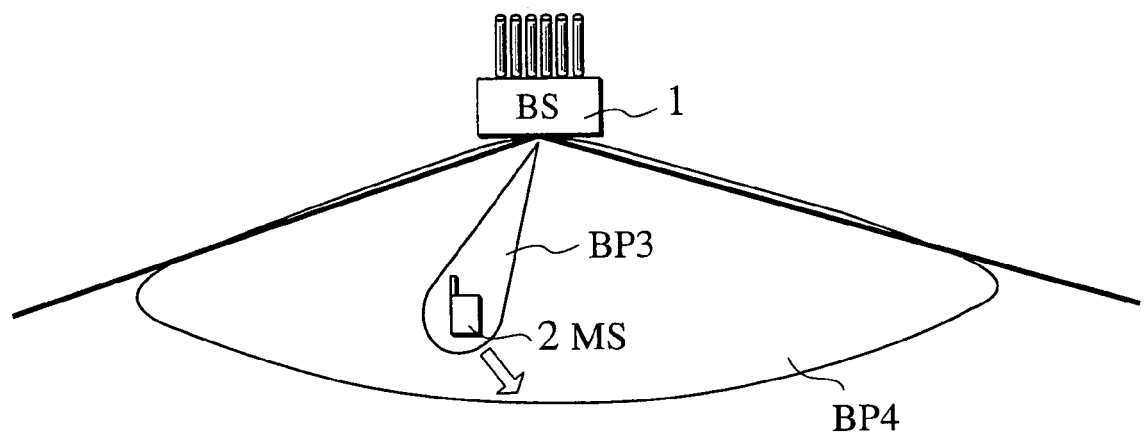
FIGS. 7A and 7B are explanatory diagrams showing variation of directional beam patterns according to the first embodiment.
Figure 7B:
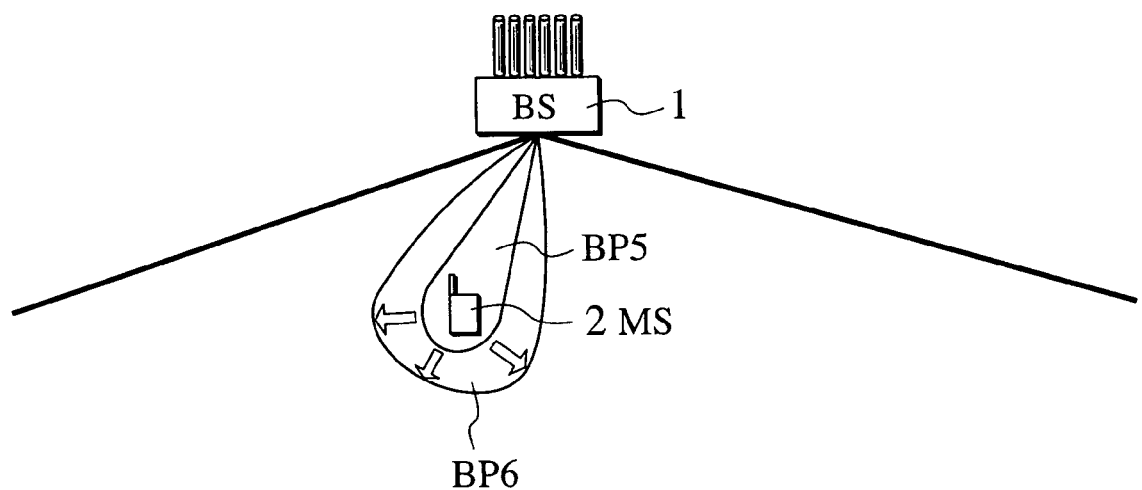

Here, FIGS. 7A and 7B show directional beam patterns applied if the up signal interval exceeds the timer threshold. As shown in FIG. 7A, the antenna weight, which is predetermined, and which produces a non-directional beam pattern may be used. Further, as shown in FIG. 7B, the base station 1 may perform an additional calculation using the antenna weight generated according to the antenna weight optimization algorithm based on the last up signal transmitted by the mobile station 2 so that the base station 1 can generate the antenna weight, which produces the directional beam pattern for the mobile station 2 being expanded from the mobile station 2 as the center.

As a result, even when the mobile station 2 moves while transmitting no up signals, disconnection of the radio link between the mobile station 2 and the base station 1 can be avoided and radio communication can be conducted between the mobile station 2 and the base station 1.

(Second Embodiment)

Figure 8:
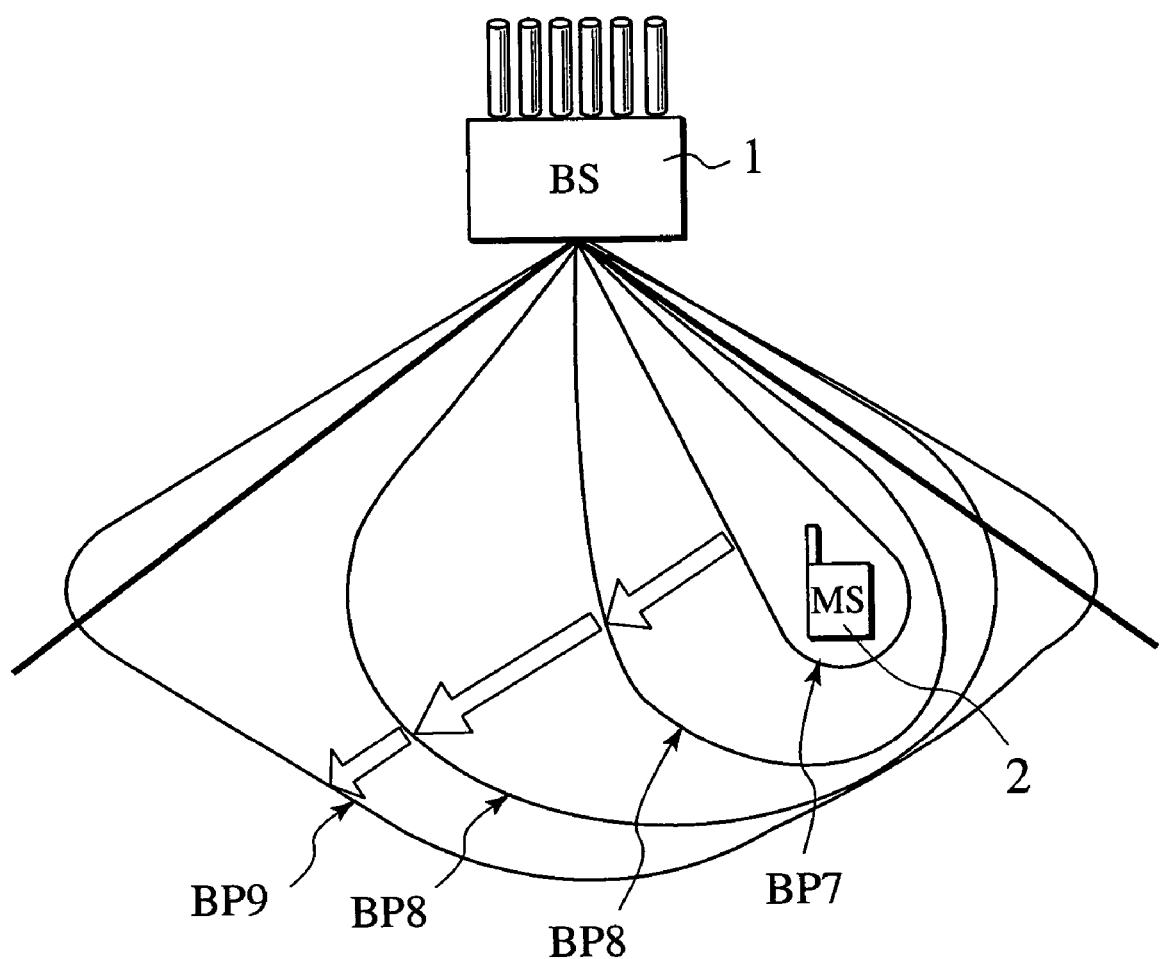
FIG. 8 is an explanatory diagram showing variation of directional beam patterns according to a second embodiment.

Hereinafter, a second embodiment of the present invention will be described. FIG. 8 is an explanatory diagram showing an example of directional beam patterns according to the second embodiment. FIG. 8, which is similar to FIG. 4, shows the state where no up signals are transmitted by the mobile station 2 during a prescribed period starting from when the directional beam for the mobile station 2 is formed by the base station 1.

The feature of the second embodiment is that the timer threshold storing unit 16 stores a plurality of timer thresholds and the antenna weight is changed in a step-by-step basis when the up signal interval exceeds each timer threshold so as to expand the width of the directional beam pattern gradually.

Specifically, a plurality of timer thresholds (T1, T2 and T3, T1<T2<T3) are stored in the timer threshold storing unit 16. The antenna weight generator 15 changes the antenna weight when the up signal interval ($\tau$) exceeds each of the timer thresholds T1, T2 and T3. The base station 1 then expands the width of the directional beam pattern in a step-by-step basis to BP7 through BP9 as shown in FIG. 8. The base station 1 expands the width to cover the entire sector in the maximum (when $\tau$>T3).

Figure 9:
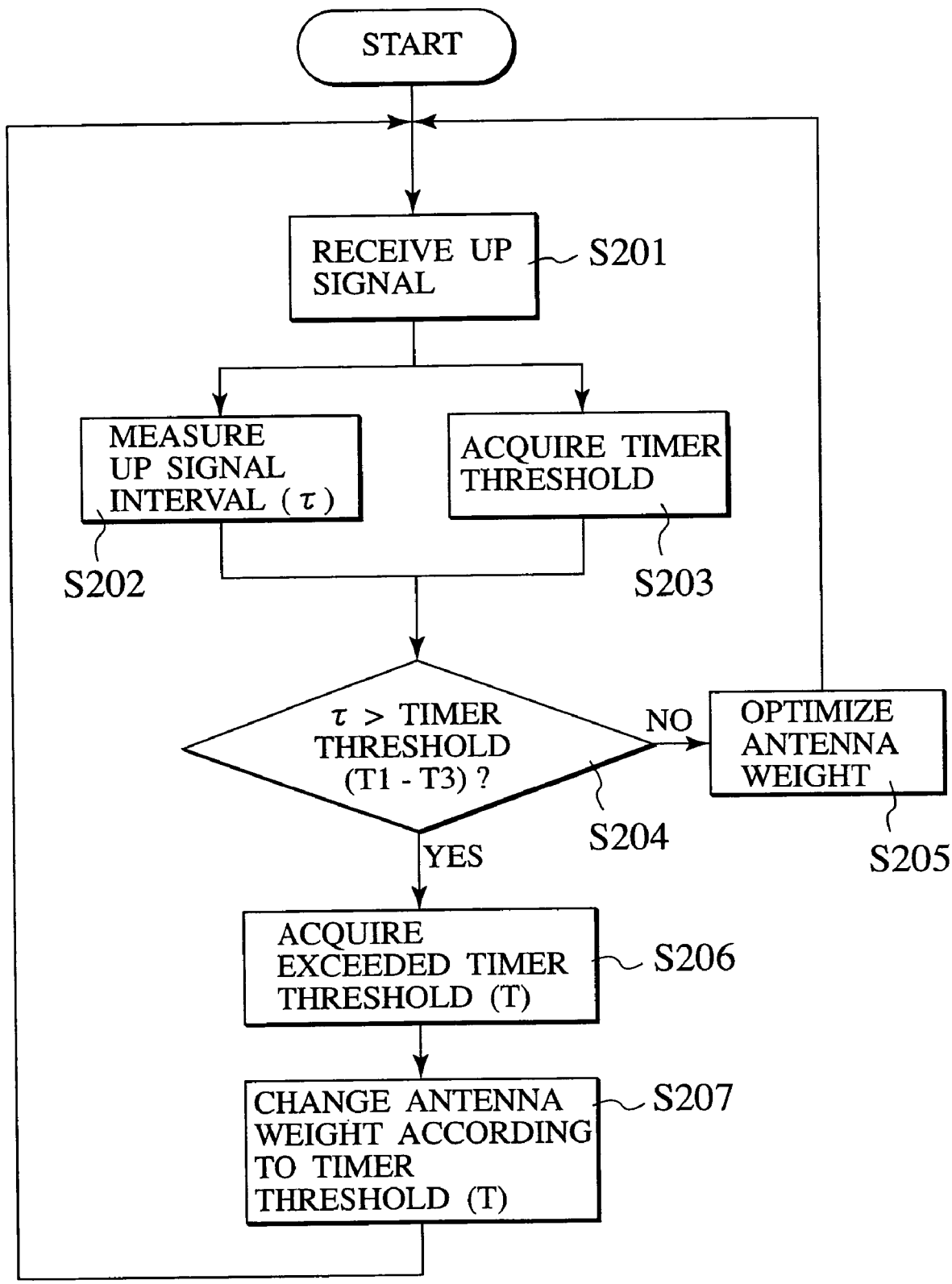
FIG. 9 is a flowchart showing operation of the communication system according to the second embodiment.

The communication system according to the second embodiment operates as follows. FIG. 9 shows a flowchart explaining an operation of the communication system according to the second embodiment.

First of all, the base station 1 receives the up signal from the mobile station 2 (S201). The up signal interval measurer 13 then measures an elapsed time from reception of the last up signal and outputs the value of the elapsed time to the comparator 14 one after another (S202). The comparator 14 acquires the value of the elapsed time, i.e., an up signal interval ($\tau$), and a timer threshold stored in the timer threshold storing unit 16 (S203). The comparator 14 then compares the up signal interval and the timer threshold (S204) and outputs a result of comparison of the up signal interval and the timer threshold to the antenna weight generator 15.

In the step S204, if the comparator 14 determines that the up signal interval ($\tau$) does not exceed the timer threshold ("N" of the step S204), the antenna weight generator 15 generates the antenna weight based on the pilot symbol included in the up signal transmitted by the mobile station 2 (S205).

On the other hand, if the comparator 14 determines that the up signal interval exceeds the timer threshold ("Y" of the step S104), the antenna weight generator 15 acquires the timer threshold (T1, T2 or T3) indicating that the up signal interval (τ) has been exceeded (S206). The antenna weight generator 15 then changes the antenna weight based on the timer threshold to expand the width of the beam pattern to BP7 through BP9 gradually, and the width is expanded to cover the entire sector in the maximum (when τ>T3) (S207).

In the communication system using directional beam according to the second embodiment, since the effect of interference reduction is limited as the width of the directional beam is expanded, the plurality of the timer thresholds are set in view of the maximum moving speed of the mobile station 2. It is therefore possible for the base station 1 to conduct radio communication effectively by expanding coverage of the directional beam pattern gradually taking into account of the maximum moving speed of the base station 1.

Incidentally, as a method to generate the antenna weight to be used when the up signal interval (τ) exceeds the timer threshold, for example, the base station 1 may perform an additional calculation using the antenna weight generated according to the antenna weight optimization algorithm based on the last up signal transmitted by the mobile station 2 so that the base station 1 can generate the antenna weights, which produces the directional beam patterns for the mobile station 2 being expanded from the mobile station 2 as the center in a step-by-step basis.

(Third Embodiment)

Hereinafter, a third embodiment of the present invention will be described. FIG. 11 is an explanatory diagram showing an example of directional beam patterns according to the third embodiment. FIG. 11, which is similar to the first and second embodiments, shows the state that no up signals are transmitted by the mobile station 2 during a prescribed period starting from when the directional beam for the mobile station 2 is formed by the base station 1.

The feature of the third embodiment is that the base station 1 changes the antenna weight so as to expand a width of the directional beam pattern when the up signal interval (τ) exceeds the timer threshold, and further changes the width of the directional beam pattern by changing the antenna weight according to the antenna weight optimization algorithm if the base station 1 receives the up signal while the directional beam pattern is being expanded.

Figure 10:
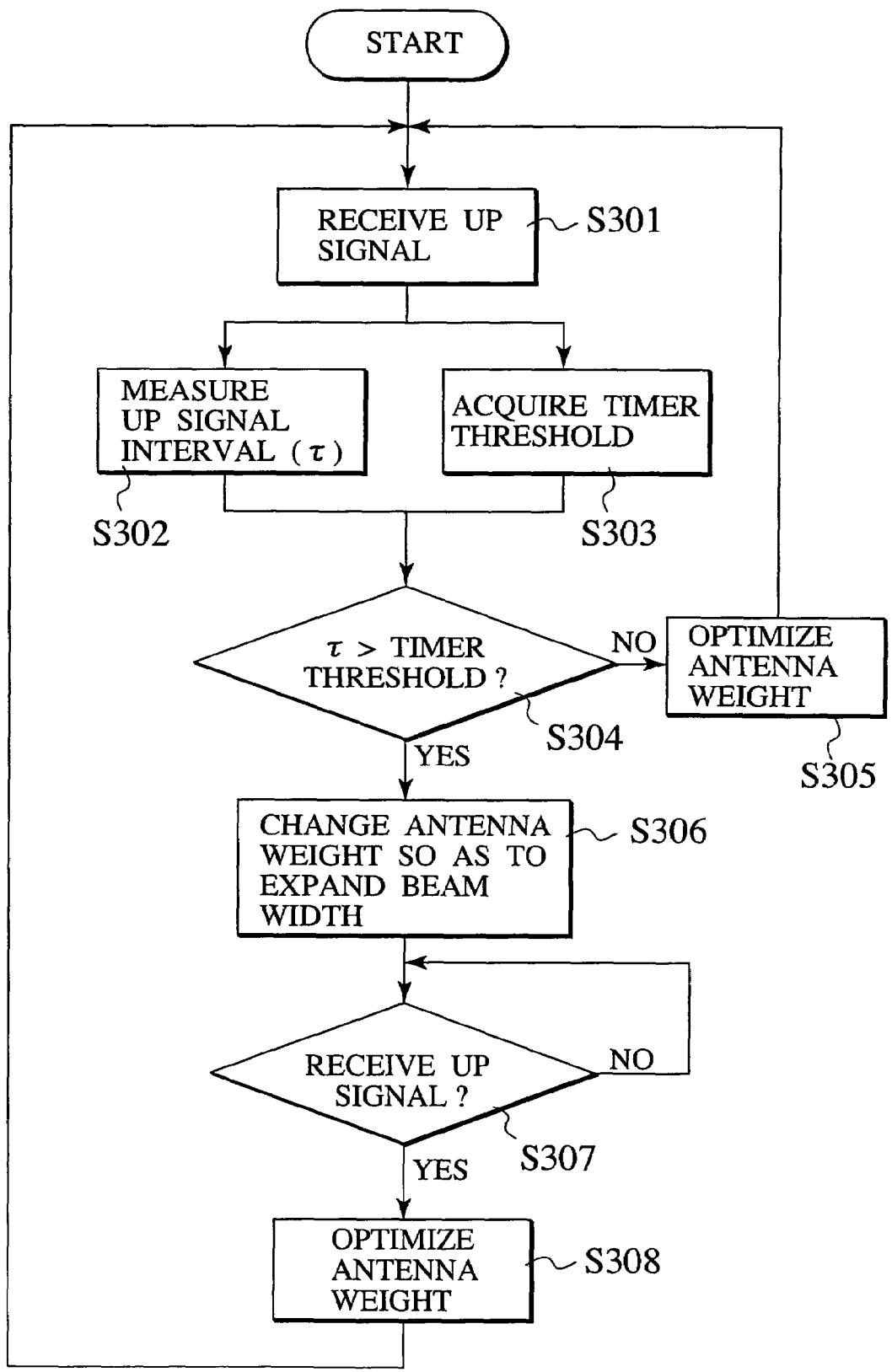
FIG. 10 is a flowchart showing operation of the communication system according to a third embodiment.

FIG. 10 shows a flowchart explaining an operation of the communication system according to the third embodiment.

Figure 11B:
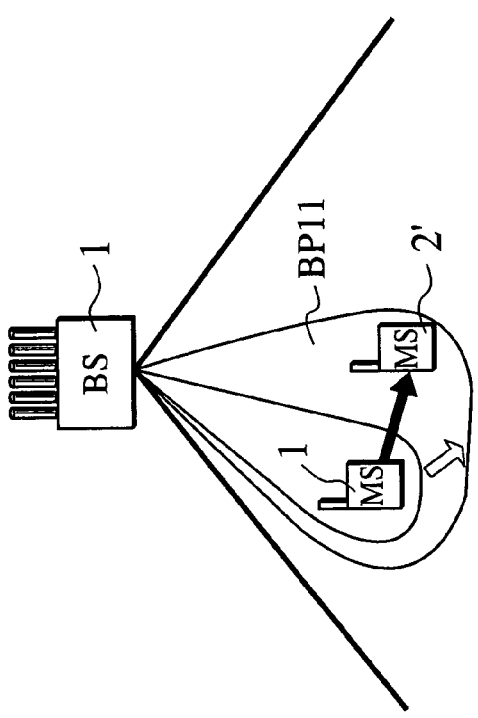
FIGS. 11A, 11B, 11C and 11D are explanatory diagrams showing variation of directional beam patterns according to the third embodiment.
Figure 11D:
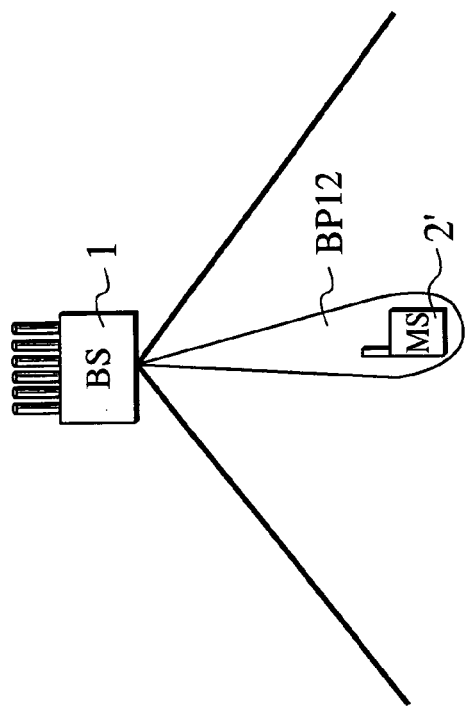
Figure 11A:
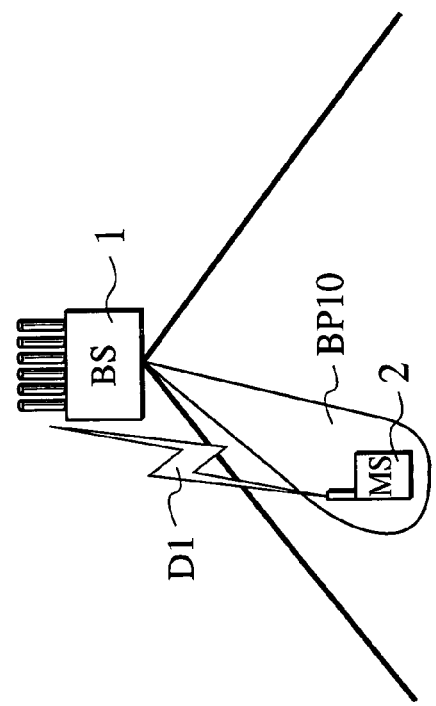

First of all, the base station 1 receives the up signal from the mobile station 2 as shown in FIG. 11A (S301). The up signal interval measurer 13 then measures an elapsed time from reception of the last up signal and outputs the value of the elapsed time to the comparator 14 one after another (S302). The comparator 14 acquires the value of the elapsed time, i.e., an up signal interval (τ), and a timer threshold stored in the timer threshold storing unit 16 (S303). The comparator 14 then compares the up signal interval (τ) and the timer threshold (S304) and outputs a result of comparison of the up signal interval (τ) and the timer threshold to the antenna weight generator 15.

At the step S304, if the comparator 14 determines that the up signal interval does not exceed the timer threshold ("N" of the step S304), the antenna weight generator 15 generates the antenna weight based on the pilot symbol included in the up signal transmitted by the mobile station 2 (S305).

Figure 11C:
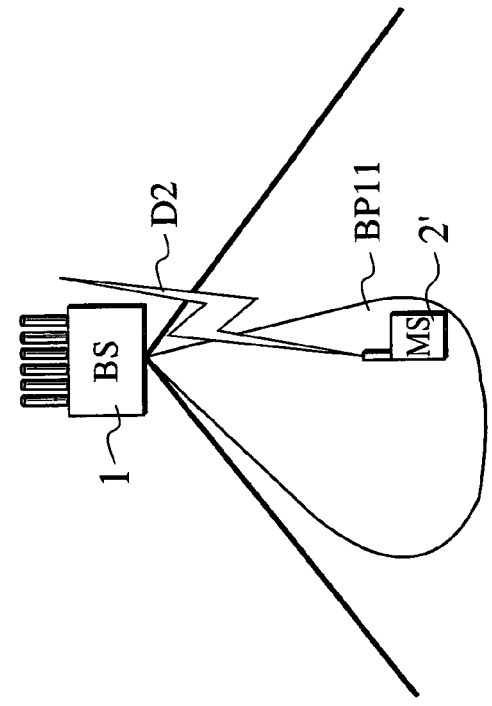

On the other hand, if the comparator 14 determines that the up signal interval exceeds the timer threshold ("Y" of the step S304), the antenna weight generator 15 changes the antenna weight to the predetermined weight as shown in FIG. 11B so as to expand the width of the directional beam pattern (S306). After the process of the step S306, if the base station 1 receives an up signal from the mobile station 2 as shown in FIG. 11C ("Y" of step S307), the base station 1 generates the narrower directional beam for the mobile station 2 according to the antenna weight optimization algorithm as shown in FIG. 11D (S308).

As a result, the radio link can be kept between the base station 1 and the mobile station 2 even when the mobile station 2 moves while transmitting no up signals. In addition, it is possible to optimize the effect of interference reduction as soon as the mobile station 2 transmits an up signal by using the narrower directional beam again once the width of the directional beam is expanded.

(Variant)

The present invention is not restricted to the first through third embodiments described above, but the following alternations may be effected.

For example, although the up signal interval measurer 13, the comparator 14 and the timer threshold storing unit 16 are deployed in the base station 1, these functional blocks may be deployed in the mobile station 2 or a radio network controller, which manages the respective base stations. In this case, the up signal interval (τ), the timer thresholds, or comparison result of (τ) and the timer thresholds acquired at the mobile station 2 or the radio network controller are notified to the base station 1 by the mobile station 2 or the radio network controller.

Further, the antenna weight generator 15 in the embodiments described above may be deployed in the radio network controller. In this case, the antenna weight generated at the radio network controller is transmitted to the base station 1.

AS heretofore described, according to the communication method using directional beam and the base station according to the present invention, it is possible to avoid disconnection of the radio link between the radio base station and the mobile station even when the mobile station moves while transmitting no up signals in a case where the radio base station transmits the directional beam.

It should be appreciated by those skilled in the art that although the present invention has been described with reference to embodiments, the present invention is not limited to the described embodiments. The present invention can be implemented in modified and altered modes without departing from the spirit and scope of the present invention defined by the appended claims. Therefore, description herein has been made for the purpose of illustration, and it does not limit the present invention in any sense.

What is claimed is:

1. A communication method using directional beam for conducting communication between a radio base station and a mobile station by a directional beam generated by an adaptive array antenna having a plurality of antenna elements, the communication method comprising the steps of:
   receiving an up signal from the mobile station;
   measuring an elapsed time from reception of the up signal;

changing an antenna weight, which is a weighting factor for a signal for each mobile station to be inputted to the adaptive array antenna, based on a result of the measuring step; and generating a directional beam pattern for each mobile station according to the antenna weight.

2. A radio base station for conducting communication with a mobile station by a directional beam generated by an adaptive array antenna having a plurality of antenna elements, the radio station comprising:
 a beam pattern generator for generating a directional beam pattern for each mobile station according to an antenna weight, which is a weighting factor for a signal to be inputted to the adaptive array antenna;
 a receiver for receiving an up signal from the mobile station;
 a timer for measuring an elapsed time from reception of the up signal; and
 an antenna weight changer for changing an antenna weight based on a result of the measuring by the timer.

3. A radio base station according to claim 2, wherein the antenna weight changer changes the antenna weight so as to expand a coverage of the directional beam if the result of the measuring by the timer exceeds a prescribed threshold.

4. A radio base station according to claim 3, wherein the antenna weight changer changes the antenna weight so as to expand the coverage of the directional beam in a step-by-step basis using a plurality of prescribed thresholds if the result of the measuring by the timer exceeds each of the prescribed thresholds.

5. A radio base station according to claim 3, wherein the antenna weight changer changes the antenna weight so as to cover an entire sector in which the mobile station is located if the result of the measuring by the timer exceeds the prescribed threshold.

6. A radio base station according to claim 2, wherein the antenna weight changer changes the antenna weight so as to expand the coverage of the directional beam if the result of the measuring by the timer exceeds a prescribed threshold, and
 the antenna weight changer further changes the antenna weight according to a prescribed algorithm if the receiver receives an up signal while the radio base station is expanding the coverage of the directional beam.

* * * * *